(12) United States Patent
Yoshino et al.

(10) Patent No.: US 6,507,809 B1
(45) Date of Patent: Jan. 14, 2003

(54) METHOD AND SYSTEM FOR SIMULATING PERFORMANCE OF A COMPUTER SYSTEM

(75) Inventors: Taisei Yoshino, Hadano (JP); Isao Watanabe, Hadano (JP); Yoshiko Tamaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/288,029

(22) Filed: Apr. 8, 1999

(30) Foreign Application Priority Data

Apr. 9, 1998 (JP) .......................................... 10-097637

(51) Int. Cl.⁷ ............................ G06F 13/10; G06F 9/44; G06F 13/12
(52) U.S. Cl. ............................ 703/21; 703/16; 703/17; 703/26
(58) Field of Search ............................... 703/6, 16, 17, 703/13, 26, 22, 15, 21; 712/12; 700/2

(56) References Cited

U.S. PATENT DOCUMENTS

| | | | |
|---|---|---|---|
| 4,901,260 A | * | 2/1990 | Lubachevsky ................ 703/17 |
| 5,278,778 A | * | 1/1994 | Akimoto et al. ............... 703/13 |
| 5,539,802 A | * | 7/1996 | De Caluwe et al. ........... 379/13 |
| 5,701,439 A | * | 12/1997 | James et al. ................... 703/17 |
| 5,715,184 A | * | 2/1998 | Tyler et al. .................... 703/15 |
| 5,826,060 A | * | 10/1998 | Santoline et al. .............. 703/6 |
| 6,324,495 B1 | * | 11/2001 | Steinman ....................... 703/17 |

FOREIGN PATENT DOCUMENTS

JP        A-8-180094        7/1996

OTHER PUBLICATIONS

Dirkx et al., Evaluation of simulation strategies for computer networks on Parallel MIMD computers IEEE International conference on computer systems and software engineering, May 1990.*

Conception, A.I., "A hierarchical computer architecture for distributed simulation", IEEE Transactions on computers, Feb., 1989.*

* cited by examiner

*Primary Examiner*—Samuel Broda
*Assistant Examiner*—Kandasamy Thangavelu
(74) *Attorney, Agent, or Firm*—Antonelli, Terry, Stout & Kraus, LLP

(57) ABSTRACT

A high-speed performance simulation method and system for simulating the performance of a large-scaled system such as a parallel computer. In implementation, the large-scaled system is divided into subsystems or partial units and the divided subsystems are simulated in parallel. Even when a particular partial unit occupies a shared resource, high-speed, well-coordinated performance simulation is achieved. A performance simulation system includes a plurality of performance simulators and an overall control section connected to these performance simulators. The plurality of performance simulators individually simulate the performances of partial units into which a simulant is divided. The overall control section causes the performance simulators to conduct the simulation processes alternately every AT cycle. When having finished a performance simulation process for a AT cycle, the first performance simulator transmits to the second performance simulator shared resource data stored in a shared resource management section, the shared resource occupation status data indicating that the shared resource is occupied. Then, the second performance simulator conducts a performance simulation process for a AT cycle and transmits shared resource occupation status data to the first performance simulator. The performance simulators responsible for subsystems that have no shared resource conduct simulation processes concurrently to increase the whole simulation speed.

10 Claims, 6 Drawing Sheets

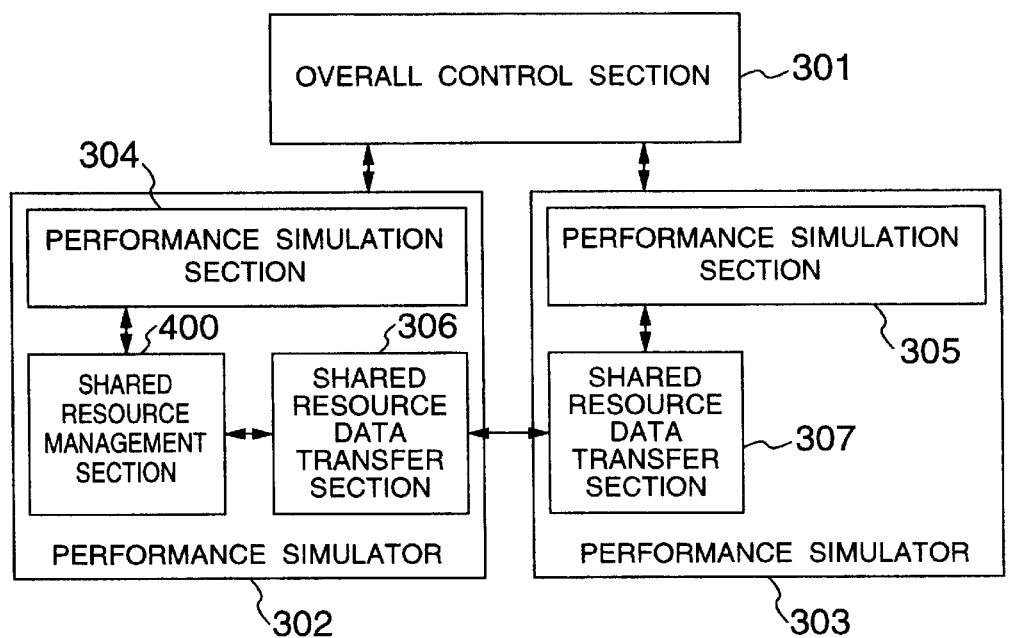

ACTUAL OPERATION OF
THE SUBSYSTEMS

FLOW OF SIMULATION PROCESSES EXECUTED
BY SIMULATOR

METHOD AND SYSTEM FOR SIMULATING PERFORMANCE OF A COMPUTER SYSTEM

BACKGROUND OF THE INVENTION

The present invention relates to a method and a system for simulating the performance of a computer system. More particularly, the invention is directed to a method and a system for implementing high-speed performance simulation of a computer system by using, a multiplicity of simulation means on a system such as a multiprocessor system.

There are needs, in recent years, for higher sophistication in designing information processing systems such as super computers and mainframes, and for such a highly sophisticated information processing system, it is necessary to analyze its performance experimentally before the actual machine is fabricated. Generally, the performance of an information processing system is determined on the basis of such factors as the hardware architecture including a pipeline structure within a CPU, the structure of a memory such as a cache and the I/O structure, and the quality of compilers for generating software that are to be executed on the information processing system, and it is increasingly important that the performance of these components be analyzed before the actual machine is fabricated and that the results be fully utilized in developing the information processing system and its compilers in order to assure high performance of the information processing system.

As a means for analyzing the performance of an information processing system, performance simulation technology is available. Performance simulation is designed to determine the time (generally the number of cycles) required for executing a given program, the hit rate of a cache, the load latency of a memory and the like of an information processing system to be simulated by creating a model of hardware architecture of the system to be simulated through software and simulating hardware behaviors activated by the given program on that model.

Performance simulation allows the user to analyze the performance of an information processing system and thus to find out hardware defects of the system before the actual machine is available. Performance simulation also allows the user to evaluate the performance of a compiler and an operating system (OS) for the information processing system, and thus contributes to improving the performance of such software.

In performance simulation, a simulation process proceeds on the basis of a synchronization clock cycle of the system to be simulated, and thus the performance of the simulant is evaluated, e.g., every machine cycle or based on the latency of a hardware event that occurs. At any rate, machine cycle is the unit of time used by major simulation methods.

As an exemplary prior art, JP-A-8-180094 discloses a performance simulation technology as described above. The prior art method simulates CPU and memory behaviors by using analysis of system calls of application programs to be executed on a model and address generators.

SUMMARY OF THE INVENTION

Such conventional performance simulation technology has its limit in the scale of an information processing system that can be handled, and thus finds difficulty handling a recently developed information processing system whose logic model is large due to the system having been large-scaled. Even if capable of handling such an information processing system, the conventional technology imposes another problem that the simulation time is increased.

An object of the present invention is to provide a method, a system and an execution program recording medium for simulating the performance of a simulant by means of synchronization technique of every plurality of cycles ($\Delta T$ cycle). When the performance simulation of a large-scaled simulant is executed by dividing the simulant into a plurality of subsystems or partial units, the method, the system and the execution program recording medium allow a simulation process to be performed for the whole part of the simulant every $\Delta T$ cycle even if the partial units have a shared resource among them, and thus contribute to reducing the overhead time due to synchronization.

Further, another object of the present invention is to provide a method, a system and an execution program recording medium that allow a plurality of performance simulators responsible for partial units having no shared resource to operate concurrently, and that allow a performance simulation process to be performed at high speed onto a large-scaled simulant especially when the plurality of performance simulators are implemented on a multiprocessor-based computer.

To achieve the above object, one aspect of the present invention provides a performance simulation method for determining the performance of an information processing system by simulating a process to be performed on the information processing system, comprising the steps of: preparing a plurality of performance simulation program means for executing performance simulation processes independently of one another and a synchronization program means for causing the performance simulation program means to conduct the simulation processes at a synchronization timing of a plurality of cycles; dividing the information processing system to be simulated into a plurality of subsystems or partial units and allocating said plurality of performance simulation program means to the plurality of divided subsystems or partial units, respectively; and causing said synchronization program means to instruct said plurality of performance simulation program means to sequentially conduct the simulation processes at the synchronization timing of the plurality of cycles, thereby to complete a simulation process for the whole subsystems or partial units of the information processing system.

To achieve the above object, another aspect of the present invention provides a performance simulation method, comprising the steps of: preparing program means for managing occupation of a shared resource among the divided partial units, and communication program means for allowing the performance simulation program means to communicate the occupation of the shared resource to one another; causing the synchronization program means to ford instruct the performance simulation program means to sequentially conduct the simulation processes; and causing the communication program means to instruct the performance simulation program means to communicate the occupation of the shared resource to one another at the synchronization timing data of a plurality of cycles.

To achieve the above object, still another aspect of the present invention provides a performance simulation method comprising a step of causing the performance simulation program means to conduct the simulation processes in parallel onto those of the partial units having no shared resource.

As a result of the afore-mentioned configuration, the present invention can avoid conflict or collision over the occupation of the shared resource among the plurality of performance simulation program means, thereby allowing the plurality of performance simulation program means to conduct simulation processes onto the partial units having the shared resource at the synchronization timing of ΔT cycle. The ΔT cycle may preferably be 2 to 10 cycles. In addition, the present invention allows parallel simulation to be effected by dividing the simulant into the plurality of partial units and by concurrently operating the performance simulation program means that are respectively responsible for the partial units having no shared resource, and thus the simulation processes can be performed at high speed.

BRIEF DESCRIPTION OF THE DRAWINGS

FIG. 1 is a block diagram showing a configuration of a performance simulation system for implementing a simulation method according to a first embodiment of the present invention;

FIG. 2 is a diagram explaining exemplary shared resource data;

Other objects, features and advantages of the present invention will become apparent from the following detailed description of the embodiments taken in conjunction with the accompanying drawings.

DESCRIPTION OF THE EMBODIMENTS

Figure 9:
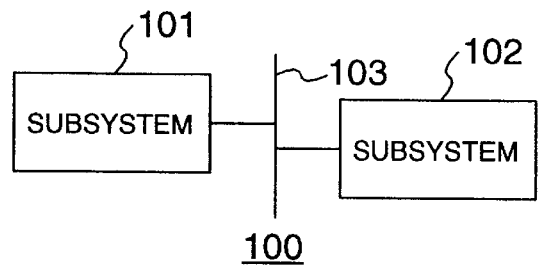
FIG. 9 is a block diagram showing an exemplary configuration of an information processing system to which a simulation method considered in achieving the present invention is applied.
Figure 10:
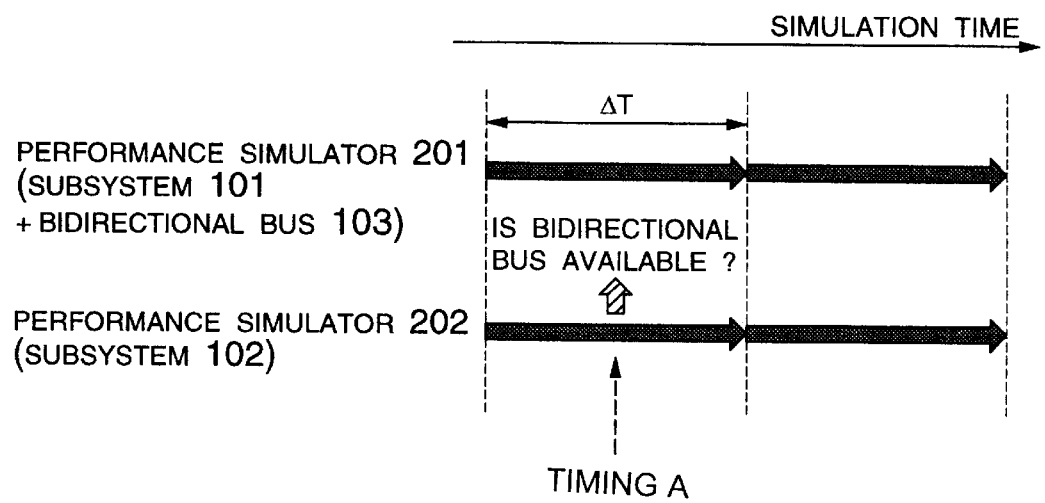
FIG. 10 is a diagram explaining how independent performance simulators simulate the operations of the information processing system shown in FIG. 9.

To facilitate the understanding of the present invention, considerations on some problems concerning performance simulation studied by the inventors will be made prior to a description of embodiments of the invention. With reference to FIGS. 9 and 10.

To implement high-speed simulation, the following approach is conceivable. That is, an information processing system, which is a simulant, is divided into a plurality of subsystems or partial units and performance simulators are made responsible for the partial units, respectively, and then such performance simulators are caused to simulate the partial units on a computer operated by a multiprocessor system. In this approach, simulation speed can be improved when the performance simulators are allocated to processors one by one. Basically, performance simulation is proceeded on a machine cycle basis as described above. Therefore, when the performance simulators conduct individual simulation processes in parallel on the multiprocessor system, the whole simulation needs to be proceeded by synchronizing the performance simulators with one another on a cyclic basis, in a strict sense. That is, this technique involves inter-process communication for synchronizing the simulators every cycle, and thus increases the overhead time for the synchronization.

To reduce the overhead time, another technique in which simulators are synchronized not every cycle but every interval including a plurality of cycles (hereinafter referred to as "ΔT cycle") is conceivable. However, this technique addresses a problem when hardware models for which the simulators are responsible include a shared resource among themselves. That is, when a shared resource is involved, the simulators are not allowed to simulate the hardware models basically on an individual basis, and thus the synchronization technique based on the ΔT cycle is inconvenient in that accurate simulation processes may not be achieved.

FIG. 9 is a block diagram showing an exemplary configuration of an information processing system to which a performance simulation method considered during the attempt of the present invention is applied, and FIG. 10 is a diagram explaining how independent performance simulators simulate the operations of the information processing system. The problems concerning performance simulation addressed by the ΔT cycle-based synchronization technique will be described below with reference to FIGS. 9 and 10. In FIG. 9, reference numeral 100 denotes an information processing system to be simulated, 101 and 102 subsystems or partial units, and 103 a bidirectional bus.

The information processor 100, which is subjected to a performance simulation process, comprises the partial units 101 and 102 that are connected to each other through the bidirectional bus 103. The partial units 101 and 102 perform the processing collaboratively while transferring data with each other through the bidirectional bus 103 that is a resource shared by the units 101 and 102 in common. The information processing system 100 is a parallel processing system that includes, e.g., a plurality of node units or processors. Each of the partial units 101 and 102 is a node unit or a processor. How such an information processing system is simulated will be described with reference to FIG. 10 by taking an example in which independent performance simulators simulate the operations of the partial units 101 and 102.

In the example shown in FIG. 10, simulation processes are supposed to be conducted by a performance simulator 201 responsible for both the partial unit 101 and the bi-directional bus 103 and by a performance simulator 202 responsible for only the partial unit 102. During the simulation processes, the performance simulators 201 and 202 are supposed to be synchronized with one another every ΔT cycle as described above.

In the above example, the performance simulator 202 that is responsible only for the partial unit 102 cannot find out whether the bidirectional bus 103 is busy or not between two synchronizing points in a simulation period. That is, the performance simulator 202 has difficulty determining whether the bidirectional bus 103 is available for the partial unit 102 for which the simulator 202 is responsible even if the partial unit 102 has to send data to the bidirectional bus 103, e.g., at a timing A in FIG. 10, because the partial unit 101 may be using the bidirectional bus 103.

As described above, in the ΔT cycle-based synchronization technique, some kind of measure has to be taken to implement accurate simulation when the simulators conduct parallel simulation processes onto those units that occupy a shared resource.

Performance simulation methods according to the embodiments of the present invention made as measures to the above-discussed problems, will now be described in detail with reference to the accompanying drawings. A first embodiment of the invention will be described with reference to FIGS. 1 to 4.

FIG. 1 is a block diagram showing a configuration of a performance simulation system for implementing a simulation method according to the first embodiment of the present invention. In FIG. 1, reference numeral 301 denotes an overall control section, reference numerals 302 and 303 denote performance simulators, reference numerals 304 and 305 denote performance simulation sections, reference numerals 306 and 307 denote shared resource data transfer sections, and reference numerals 400 denotes a shared resource management sections.

The performance simulation system shown in FIG. 1 is supposed to simulate an information processing system having such a configuration as described with reference to FIG. 9. The performance simulation system shown in FIG. 1 comprises the overall control section 301 that controls the overall operation, the performance simulator 302 and the performance simulator 303. While an example in which two performance simulators are occupied is presented to simplify the description, this embodiment includes examples in which three or more performance simulators are occupied. These two simulators 302 and 303 simulate the partial units 101 and 102, respectively, when a performance simulation process is carried out onto, e.g., the information processing system described with reference to FIG. 9. The performance simulators 302 and 303 incorporate the performance simulation sections 304 and 305, respectively, and thus have the function of conducting performance simulation processes onto the subsystems for which they are responsible.

Since the performance simulation section for individual subsystems or partial units is an existing technology, a description of test program data, input data such as hardware model structure information and hardware timing information, and output data such as performance simulation results is omitted here.

The overall control section 301 has a function of operating the performance simulators 302 and 303 alternately every ΔT cycle. In the example shown in FIG. 1, the overall control section 301 first instructs, e.g., the performance simulator 302 to conduct a performance simulation process for a ΔT cycle. Then, after having confirmed that the performance simulator 302 has finished the performance simulation process for a ΔT cycle, the overall control section 301 instructs the performance simulator 303 to conduct a performance simulation process for a ΔT cycle. By repeating these operations, the overall control section 301 causes the performance simulators 302 and 303 to conduct performance simulation processes alternately every ΔT cycle.

The performance simulator 302 incorporates the shared resource management section 400 and the shared resource data transfer section 306 in addition to the performance simulation section 304. The shared resource management section 400 stores shared resource occupation data indicating that the shared resource is busy or occupied (hereinafter referred to simply as "shared resource data" whenever appropriate). That is, e.g., referring to the example shown in FIG. 9, the section 400 stores shared resource occupation data indicating that the bidirectional bus that is shared between the partial units is busy. The shared resource occupation data transfer section 306 transmits shared resource data stored by the shared resource management section 400 to the other performance simulator 303, and receives shared resource data from the performance simulator 303 and informs the shared resource management section 400 of the received data.

On the other hand, the performance simulator 303 incorporates the performance simulation section 305 and the shared resource data transfer section 307. The shared resource data transfer section 307 receives shared resource data from the performance simulator 302, delivers the received data to the performance simulation section 305, and transmits to the performance simulator 302 shared resource data that is the result of a simulation process conducted by the performance simulation section 305.

The performance simulation system for implementing performance simulation according to the present invention first causes the overall control section 301 to instruct the performance simulator 302 so that the simulator 302 will conduct a performance simulation process for a ΔT cycle. During the process, the performance simulation section 304 simulates the performance of both the partial unit and the shared resource for which it is responsible, and as a result, stores shared resource data in the shared resource management section 400. At that time, there is no conflict over the occupation of the shared resource because the performance simulator 303 has not yet started a performance simulation process.

When the performance simulator 302 has completed the performance simulation process for a ΔT cycle, the shared resource data transfer section 306 transmits the shared resource data to the performance simulator 303, and also informs the overall control section 301 that the simulator 302 has completed the simulation process for a ΔT cycle. When so informed, the overall control section 301 instructs the performance simulator 303 to conduct a performance simulation process for a ΔT cycle.

Then, the performance simulator 303 activates the performance simulation process for a ΔT cycle. Before starting the process, the performance simulation section 305 that actually conducts the process refers to the shared resource data previously received from the performance simulator 302. For example, when trying to occupy the shared resource at a certain cycle, the performance simulation section 305 refers to shared resource occupation data, and if finding out that the shared resource is occupied at that cycle because the performance simulator 302 is conducting a simulation process, then the performance simulation section 305 tries to use the shared resource at some later cycle when the shared resource is available, determining that the shared resource is busy at that cycle.

The performance simulator 303 conducts the performance simulation process for a ΔT cycle in this way, and when the simulator 303 requires occupying of the shared resource, sends the shared resource data to the performance simulator 302 through the shared resource data transfer section 307. At the same time, the performance simulator 303 also informs the overall control section 301 of the end of its simulation process for a ΔT cycle. The overall control section 301 that is so informed then sends a simulation start instruction to the performance simulator 302, and the performance simulator 302 repeats the afore-mentioned operations.

As described above, the performance simulation system simulates the performance of an information processing system, which is a simulant, by dividing the information processing system into a plurality of subsystems or partial units, causing independent performance simulators respectively responsible for the partial units to conduct performance simulation processes alternately every ΔT cycle, and by allowing the simulators to exchange with each other the data indicating that a shared resource is busy. As a result, contention over the occupation of the shared resource between the simulators can be avoided, and thus well-coordinated and well-matched performance simulation can be implemented. In addition, this system causes the simulators to synchronize with each other every ΔT cycle, and this allows the overhead time required for synchronization to be reduced compared with synchronization based on a single cycle.

Next, the operation of the performance simulation system implementing the simulation method of the present invention will be described in further detail with reference to FIGS. 2 to 4.

By way of example, shared resource occupation status data stored by the shared resource management section 400 which is shown in FIG. 2 is that of the bidirectional bus 103 shown in FIG. 9. The shared resource occupation status data indicates an occupation status as to whether the shared resource is busy, and in the example shown in FIG. 2, the data includes the cycle (time) at which occupation of the bidirectional bus as the shared resource is initiated, the cycle (time) at which the occupation of the bidirectional bus is completed, and the transaction type of the occupied bus. The performance simulators 302 and 303 described with reference to FIG. 1 determine whether they can occupy the shared resource at a certain cycle by referring to the shared resource occupation data, and when they have occupied the shared resource, store such information that they have occupied the shared resource as the shared resource data.

Figure 3A:
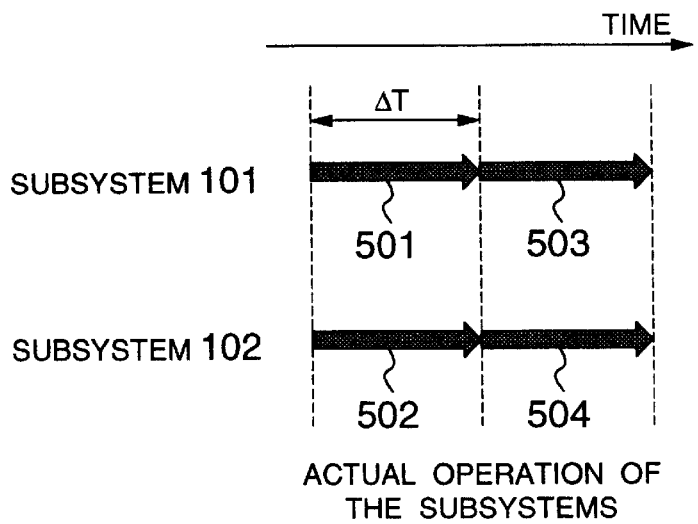
FIGS. 3A and 3B are diagrams explaining how performance simulation processes are conducted.

FIG. 3 explains how performance simulation processes are conducted, in which FIG. 3A shows how the partial units, which are the actual processing units, operate. The horizontal line with the arrow indicates the actual time. As shown in FIG. 3A, the partial unit 101 and the partial unit 102 are performing concurrent processing. That is, when their processing is segmented by ΔT, a segment 501 and a segment 502 are processed concurrently, while a segment 503 and a segment 504 are processed concurrently.

Figure 3B:
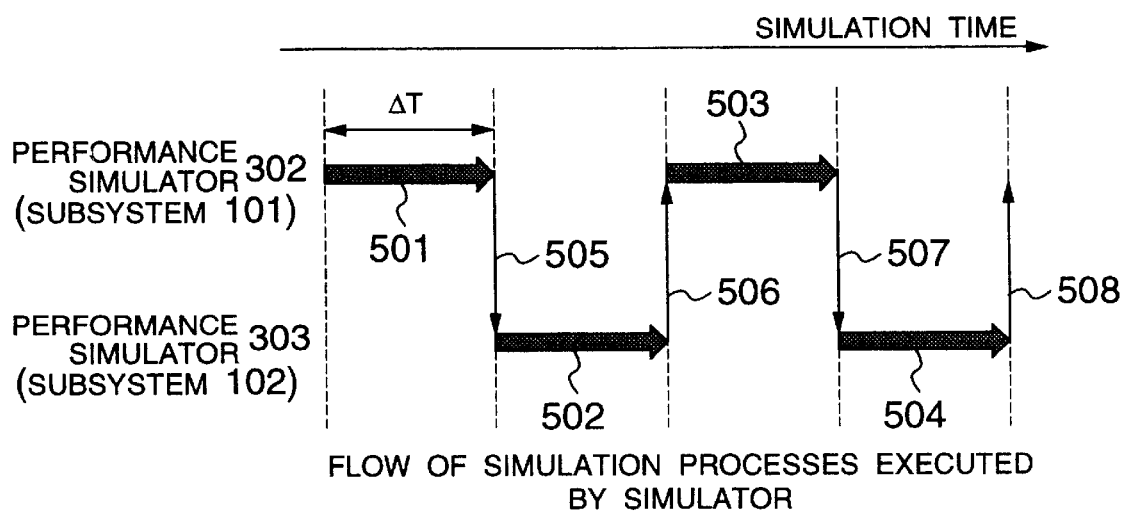
Figure 4:
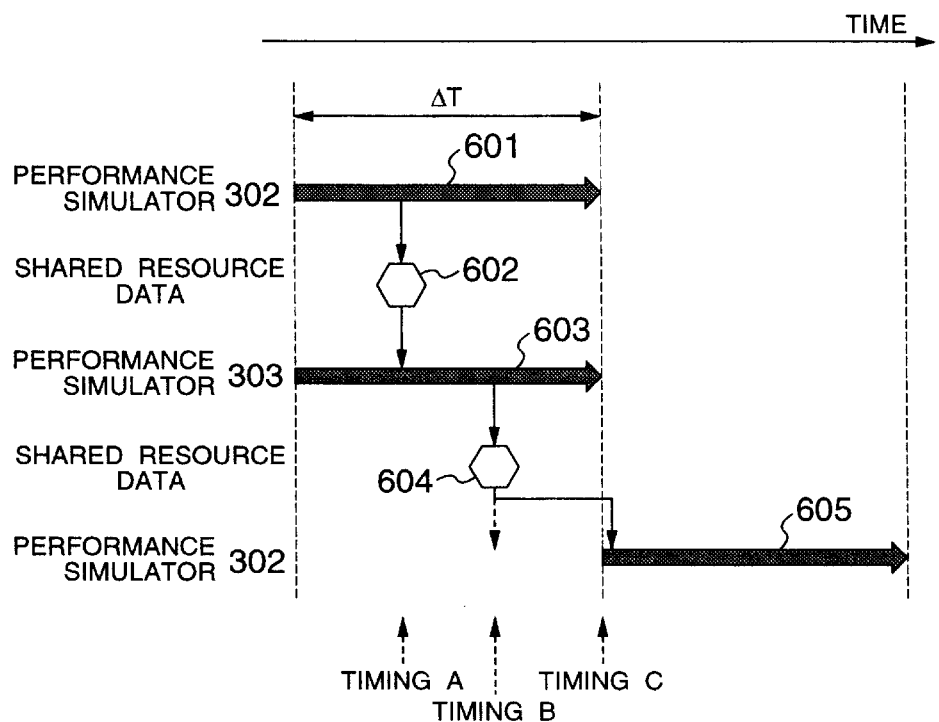
FIG. 4 is a diagram explaining how shared resource data influence the performance simulation processes.

On the other hand, FIG. 3B shows how the performance simulation system conducts performance simulation processes. The horizontal line with the arrow indicates the simulation time. First, the performance simulator 302 conducts a performance simulation process for a ΔT cycle that is equivalent to the segment 501, and upon end of the simulation process, the simulator 302 transmits shared resource occupation status data 505 to the performance simulator 303.

Then, the performance simulator 303 simulates the performance of the partial unit 102 for which it is responsible for a ΔT cycle that is equivalent to the segment 502 while referring to the received shared resource data 505, and transmits shared resource data 506 to the performance simulator 302. Successively, the performance simulator 302 conducts a performance simulation process for another ΔT cycle that is equivalent to the segment 503, and thereafter repeats the afore-mentioned operations.

As described above, the performance simulation system causes the performance simulators 302 and 303 to conduct simulation processes alternately and to exchange shared resource occupation status data with each other, so that conflict over the occupation of the shared resource can be avoided, and thus well-coordinated performance simulation can be implemented. A performance simulator having priority for the occupation of the shared resource can conduct a performance simulation process first.

There is some case where coordination over the occupation of the shared resource during simulation is somewhat disturbed. Such a case will be described with reference to FIG. 4. FIG. 4 shows how the performance simulation system operates. The operation of the actual machines or units proceeds along a horizontal time line. The performance simulation steps are proceeded along the vertical direction.

The performance simulation system shown in FIG. 1 first causes the performance simulator 302 to conduct a simulation process for a segment 601. It is supposed here that a shared resource occupation data 602 representing that the shared resource has been occupied is generated at a timing A. Then, the performance simulator 303 conducts a simulation process for a segment 603. In this case, the performance simulator 303 can consider the shared resource occupation data 602 at the timing A even during the simulation process for the segment 603. Further, it is supposed that a shared resource occupation data 604 is generated at a timing B during the same segment 603. In this case, the performance simulator 302 cannot consider the shared resource occupation data 604 at the timing B during its simulation process for the segment 601. That is, the simulator 302 can consider the shared resource occupation data 604 only at a timing C, which is the next synchronizing point.

That is, the performance simulation system shown in FIG. 1 which implements the performance simulation method of the present invention cannot conduct simulation processes accurately in a strict sense. However, unless the ΔT, which is defined as a synchronization timing of every 2 to 10 cycles, is set to a large value, a simulation error based on such synchronization timing is negligible and thus imposes practically no problem.

In the performance simulation method according to the first embodiment of the present invention, the simulant is divided into a plurality of partial units, and the performance simulators respectively responsible for the partial units simulate the operations of the partial units. Thus, the performance simulators conduct simulation processes alternately. The present invention may also be applied to a case where an information processing system, which is a simulant, is divided into a larger number of partial units (the number of partial units may preferably be determined, e.g., on the basis of load distribution), and performance simulators are allocated to the partial units so as to simulate the partial units respectively. In such a case, the plurality of performance simulators may be operated sequentially on a cyclic basis.

As described above, in the performance simulation method according to the first embodiment of the present invention, a large-scaled simulant is divided into partial units, and these partial units are simulated respectively by performance simulators, so that the method allows a large-scale computer system to be simulated. Further, in the performance simulation method according to the first embodiment of the present invention, even if the partial units occupy a shared resource such as a bus, the performance simulators can simulate the partial units alternately by exchanging shared resource data with each other. Therefore, well-coordinated and matched performance simulation can be implemented.

Figure 5:
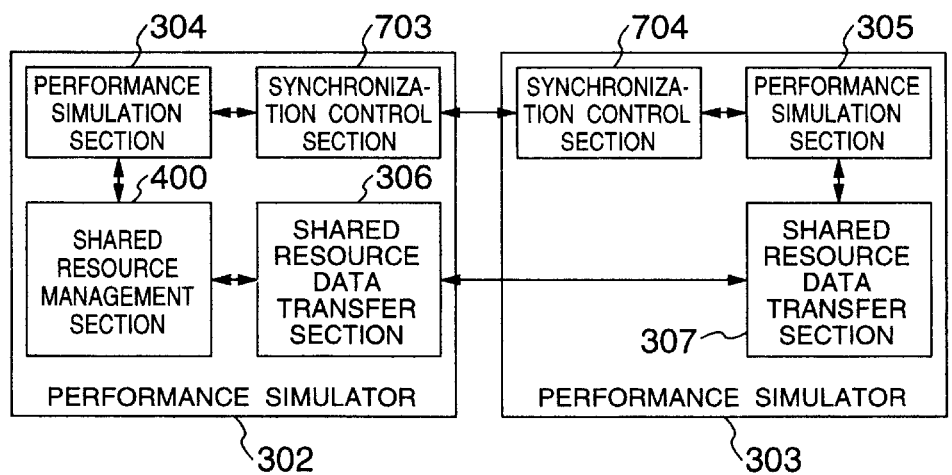
FIG. 5 is a block diagram showing a configuration of a performance simulation system for implementing a simulation method according to a second embodiment of the present invention.

FIG. 5 is a block diagram showing a configuration of a performance simulation system for implementing a simulation method according to a second embodiment of the present invention. In FIG. 5, reference numerals 703 and 704 denote synchronization control sections, and other reference numerals denote the same components as in FIG. 1.

The performance simulation system shown in FIG. 5 has functions similar to those of the performance simulation system shown in FIG. 1 except that the performance simulators 302 and 303 incorporate, in place of the overall control section 301 shown in FIG. 1, the synchronization control sections 703 and 704.

The performance simulation system shown in FIG. 5 operates as follows. When the performance simulator 302 finishes a simulation process for a ΔT cycle, the synchronization control section 703 informs the synchronization control section 704 of the performance simulator 303 that the simulator 302 has finished the simulation process. When so informed by the synchronization control section 703 of the performance simulator 302, the synchronization control section 704 causes the performance simulator 303 to start a performance simulation process for a ΔT cycle. Similarly, when having finished the performance simulation process, the performance simulator 303 causes the synchronization control section 704 to inform the synchronization control section 703 of the performance simulator 302 that the simulator 303 has finished the process. The synchronization control section 703 that has been so informed causes the performance simulator 302 to start a simulation process for the next ΔT cycle. A performance simulation process for the whole part of the simulant proceeds by repeating the aforementioned operations. In the above operations, the shared resource data transfer section 307 and the shared resource management section 400 operate similarly to those of FIG. 1.

As described above, the performance simulation system shown in FIG. 5 can simulate the performance of the simulant based on ΔT cycle synchronization without the overall control section unlike the system described with reference to FIG. 1, and still can provide exactly the same advantages as the system shown in FIG. 1.

Figure 6:
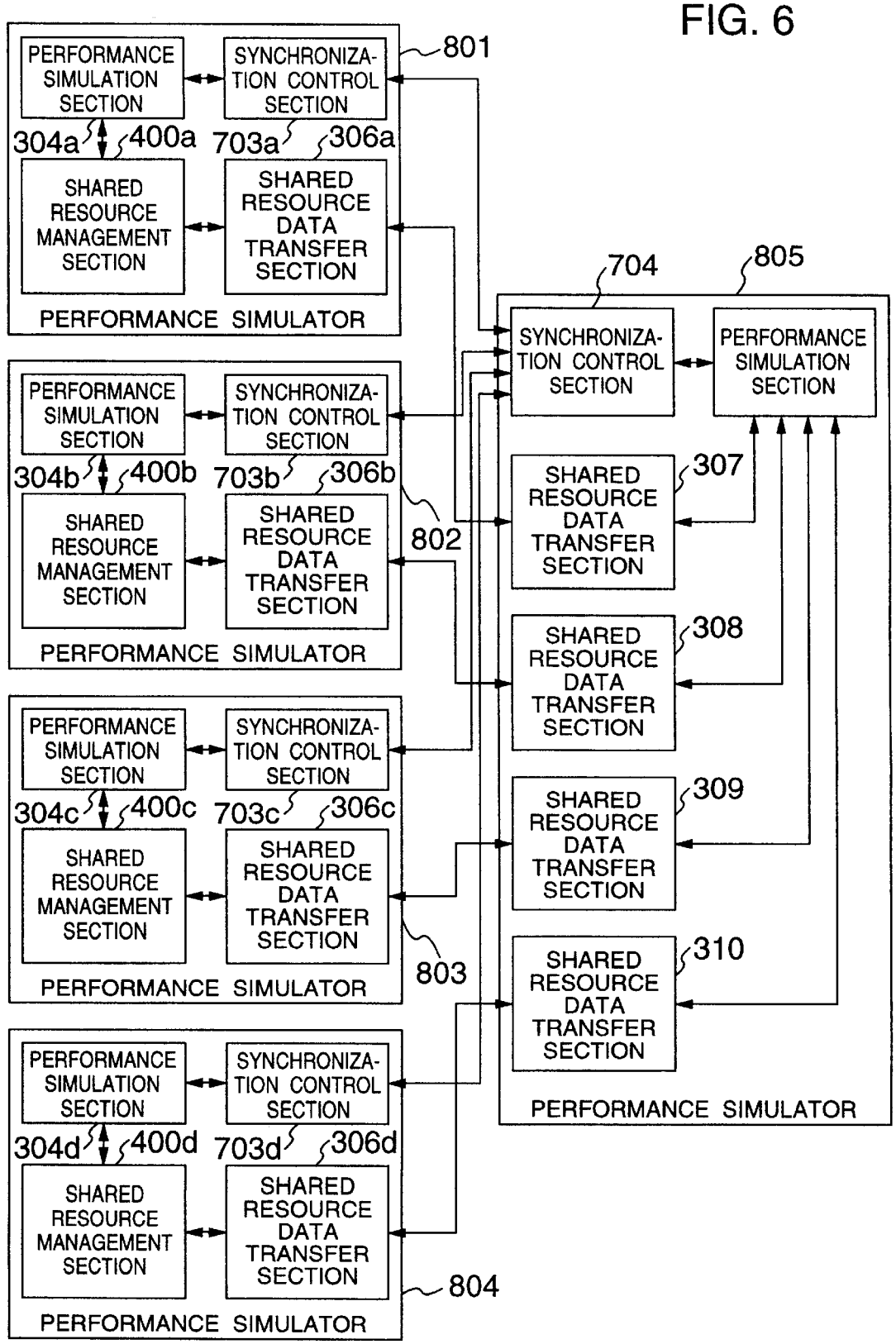
FIG. 6 is a block diagram showing a configuration of a performance simulation system for implementing a simulation method according to a third embodiment of the present invention.
Figure 7:
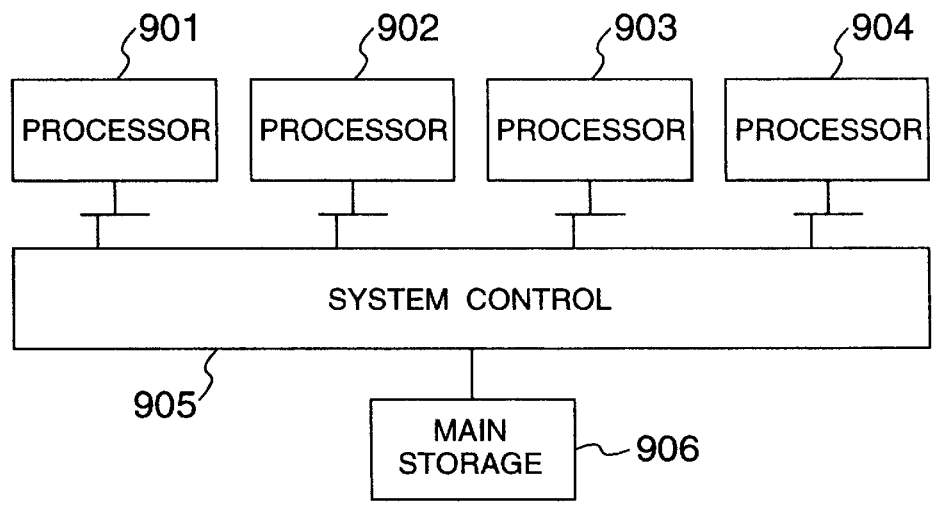
FIG. 7 is a block diagram showing an exemplary configuration of an information processing system for which the simulation system shown in FIG. 6 conducts performance simulation processes.
Figure 8:
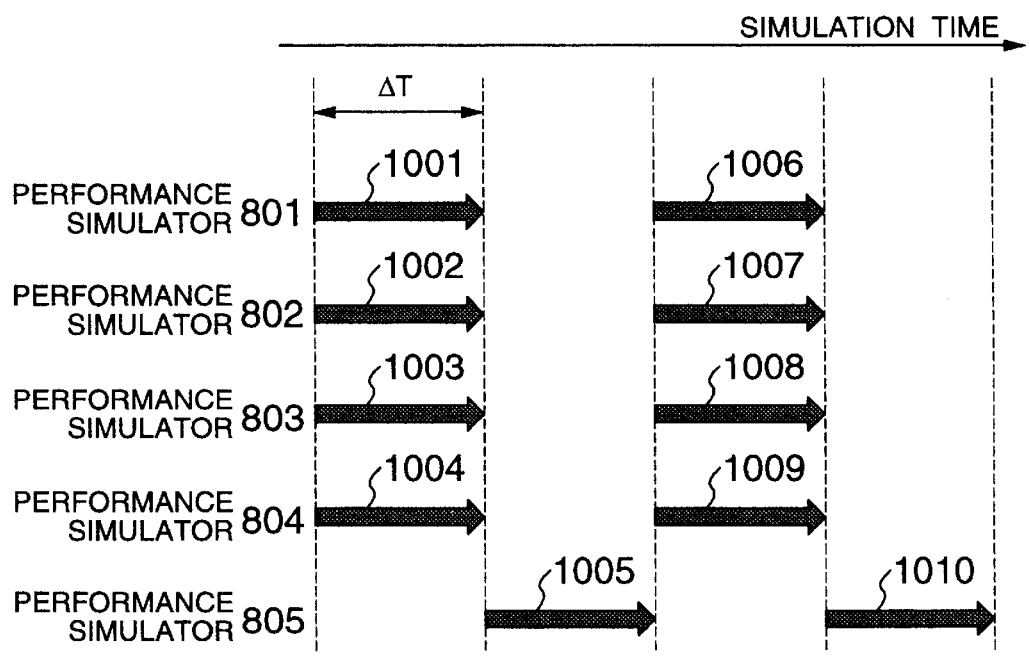
FIG. 8 is a diagram explaining how the simulation system shown in FIG. 6 conducts performance simulation processes.

FIG. 6 is a block diagram showing a configuration of a performance simulation system for implementing a simulation method according to a third embodiment of the present invention. FIG. 7 is a block diagram showing an exemplary configuration of an information processing system to be simulated by the simulation system shown in FIG. 6. FIG. 8 is a diagram explaining how the simulation system shown in FIG. 6 conducts performance simulation processes. In FIGS. 6 and 7, reference numerals 307 to 310 denote shared resource data transfer (transmission and reception) sections, 801 to 805 performance simulators, 901 to 904 processors, 905 a system control, 906 a main storage, and other reference numerals denote the same components as in FIG. 5.

The performance simulation system shown in FIG. 6 comprises the performance simulators 801 to 805. The performance simulators 801 to 804 have a configuration similar to that of the performance simulator 302 shown in FIG. 5, and thus include performance simulation sections 304a to 304d and shared resource management sections 400a to 400d. Further, the performance simulator 805 has a configuration similar to that of the performance simulator 303 shown in FIG. 5, but has four shared resource data transfer sections 307 to 310 in order to transfer shared resource data with shared resource data transfer sections 306a to 306d of the performance simulators 801 to 804. Furthermore, the synchronization control section 704 of the performance simulator 805 is connected to the synchronization control sections 703a to 703d of the performance simulators 801 to 804.

The performance simulation system shown in FIG. 6 simulates the performance of a processing system whose configuration is such as shown in FIG. 7. In the configuration shown in FIG. 7, processors 901 to 904 are connected to the system control 905, and the system control 905 to the main storage 906. Each of the processors 901 to 905 is supposed to have a dedicated bus through which it is connected to the system control 905. This processing system is a switched SMP (Sysmetric MultiProcessor), which is an ordinary multiprocessor architecture.

In the performance simulation system shown in FIG. 6 which simulates the processing system having the aforementioned configuration, the performance simulators 801 to 804 simulate the performances of the processors 901 to 904, respectively, and the performance simulator 805 simulates the operations between the system control 905 and the main storage 906.

In FIG. 7, each of the processors 901 to 904 are connected to the system control 905 via a dedicated bidirectional bus, and thus each processor shares a resource with the system control 905. On the other hand, the processors 901 to 904 share no resource in common, and thus these processors operate independently of one another. Therefore, in the performance simulation system shown in FIG. 6, the performance simulators 801 to 804 have to communicate with the performance simulator 805 for shared resource management, while the performance simulators 801 to 804 do not have to communicate with one another for shared resource management. Hence, the performance simulators 801 to 804 can simulate the performances of the processors 901 to 904 independently as well as in parallel.

Next, how the performance simulation system shown in FIG. 6 conducts simulation processes will be described with reference to FIG. 8. In FIG. 8, the horizontal line with the arrow indicates the simulation time.

As shown in FIG. 8, the performance simulators 801 to 804 conduct performance simulation processes 1001 to 1004 for a ΔT cycle in parallel onto the processors for which they are responsible. When having finished the simulation processes, the performance simulators 801 to 804 cause the shared resource data transfer sections 306a to 306d to transmit shared resource data to the corresponding shared resource data transfer sections 307 to 310 of the performance simulator 805, and cause the synchronization control sections 703a to 703d to inform the synchronization control section 704 of the performance simulator 805 that the simulators 801 tO 804 have finished the simulation processes for a ΔT cycle.

After having been so informed by all the other performance simulators 801 to 804, the synchronization control section 704 causes the performance simulator 805 to start conducting a performance simulation process 1005 for a ΔT cycle onto the partial units for which the simulator 805 is responsible. Upon end of its simulation process, the performance simulator 805 transmits shared resource data to the shared resource data transfer sections 306a to 306d of the performance simulators 801 to 804 through the shared resource data transfer sections 307 to 310, and informs the synchronization control sections 703a to 703d of the performance simulators 801 to 804 through the synchronization control section 704 that the simulator 805 has finished its simulation process.

After having been so informed from the performance simulator 805, the performance simulators 801 to 804 conduct simulation processes 1006 to 1009 for the next $\Delta T$ cycle. A performance simulation for the whole part of the system under simulation proceeds by repeating the aforementioned operations.

As described above, the performance simulation system shown in FIG. 6 causes the performance simulators to simulate the independent partial or subsystems units having no shared resource for which the simulators are responsible concurrently. Therefore, the system can accomplish a high-speed processing. The system shown in FIG. 6 particularly contributes to improving the quality of simulation for the whole part of the system under simulation, taking advantage of parallel simulation implemented through one-simulator-to-one-processor allocation in a multiprocessor-based computer.

The performance simulation method of the present invention can be applied to the simulation of a process that is to be conducted on an information processing system such as a massively parallel computer in which many nodes are connected to one another on a network. In such a case, the method allows the nodes to be simulated in parallel if the nodes have no shared resource such as a system bus. The performance simulation method disclosed above can be implemented by a computer program encoded in a recording medium for storing the program therein, such as a semiconductor memory, a floppy disk, a tape (MT), an optical disk or the like.

What is claimed is:

1. A computer-implemented performance simulation method for determining the performance of an information processing system by simulating a process to be conducted on the information processing system, comprising the steps of:
   preparing a plurality of performance simulation program means for conducting performance simulation processes independently of one another and a synchronization program means for causing said performance simulation program means to conduct the simulation processes at a synchronization timing of a plurality of cycles;
   dividing said information processing system into a plurality of subsystems and allocating said plurality of performance simulation program means to said plurality of subsystems, respectively;
   causing said synchronization program means to instruct said plurality of performance simulation program means to sequentially conduct the simulation processes at said synchronization timing of the plurality of cycles, thereby outputting a simulation result for the whole of the information processing system;
   preparing program means for managing an occupation of a shared resource among the plurality of divided subsystems, and communication program means for allowing said performance simulation program means to communicate information representing the occupation of the shared resource to one another;
   causing said synchronization program means to instruct said performance simulation program means to sequentially conduct the simulation processes;
   causing the communication program means to instruct the performance simulation program means to communicate said information representing said occupation of said shared resource to one another at said synchronization timing of said plurality of cycles; and
   causing said performance simulation program means to conduct the simulation processes in parallel onto the subsystems having no shared resource.

2. A performance simulation method according to claim 1, wherein the information processing system comprises a parallel computer system and each of the subsystems comprises a parallel computer.

3. A performance simulation method according to claim 1, wherein the synchronization timing of the plurality of cycles includes synchronization timings of 2 to 10 cycles.

4. A performance simulation system for determining the performance of an information processing system by simulating a process to be conducted on the information processing system, comprising:
   a plurality of performance simulation program executing means for executing performance simulation programs independently of one another;
   synchronization program executing means for causing said performance simulation program executing means to execute the simulation program at a synchronization timing of a plurality of cycles;
   means for dividing the information processing system into a plurality of subsystems and allocating the plurality of performance simulation program executing means to the plurality of divided subsystems, respectively;
   execution managing means for causing said plurality of performance simulation program executing means to sequentially execute the simulation programs at said synchronization timing of the plurality of cycles, thereby providing a simulation result for the whole of the information processing system;
   program executing means for managing an occupation of a shared resource among the plurality of divided subsystems;
   communication program executing means for allowing the performance simulation program means to communicate information representing the occupation of the shared resource to one another, wherein the synchronization program means instructs said performance simulation program executing means to sequentially execute the simulation programs, and the communication program executing means causes the performance simulation program executing means to communicate the information representing the occupation of the shared resource to one another at the synchronization timing of the plurality of cycles; and
   means for causing said performance simulation program executing means to execute the simulation programs in parallel onto the subsystems having no shared resource.

5. A performance simulation system according to claim 4, wherein the information processing system comprises a parallel computer system and each of the subsystems comprises a parallel computer.

6. A performance simulation system according to claim 4, wherein the synchronization timing of the plurality of cycles includes synchronization timings of 2 to 10 cycles.

7. A computer readable recording medium for storing a program for implementing a performance simulation method using a computer, the performance simulation method serving to determine the performance of an information processing system by simulating a process to be conducted on the information processing system and comprising the steps of:
   preparing a plurality of performance simulation program means for conducting performance simulation processes independently of one another and synchronization program means for causing said performance simulation program means to conduct the simulation processes at a synchronization timing of a plurality of cycles;

dividing said information processing system into a plurality of subsystems and allocating said plurality of performance simulation program means to the plurality of divided subsystems, respectively;

causing said synchronization program means to instruct the plurality of performance simulation program means to sequentially conduct the simulation processes at said synchronization timing of the plurality of cycles, thereby outputting a simulation result for the whole of the information processing system;

preparing program means for managing an occupation of a shared resource among the plurality of divided subsystems, and communication program means for allowing said performance simulation program means to communicate information representing the occupation of the shared resource to one another;

causing said synchronization program means to instruct said performance simulation program means to sequentially conduct the simulation processes; and causing the communication program means to instruct the performance simulation program means to communicate said information representing the occupation of the shared resource to one another at said synchronization timing of the plurality of cycles; and causing the performance simulation program means to conduct the simulation processes in parallel onto the subsystems having no shared resource.

8. A performance simulation method for determining the performance of an information processing system by simulating a process to be conducted on the information processing system having a plurality of subsystems and a shared resource between at least two of the plurality of subsystems and by providing a synchronizing program for synchronizing at a synchronizing timing, simulations based on said performance simulation programs allocated to a plurality of subsystems, said plurality of performance simulation programs conducting performance simulation processes independently of one another, said method comprising the steps of executing ones of the plurality of performance simulation programs allocated to the plurality of subsystems having a shared resource therebetween to sequentially conduct the simulation processes alternately at each synchronization timing; and executing ones of the plurality of performance simulation programs allocated to the plurality of subsystems having no shared resource therebetween concurrently and in parallel.

9. A performance simulation method according to claim 8, wherein the performance simulation programs allocated to the subsystems having no shared resource therebetween each include a managing program for managing other performance simulation programs, synchronizes the other performance simulation programs by communicating with the other performance simulation programs and thereby controlling the other performance simulation programs, and controls the execution of the performance simulation programs in accordance with information indicating an occupation status of the shared resource.

10. A performance simulation method according to claim 8, wherein the plurality of subsystems are connected to one another on a network, and the performance simulation allocated to the subsystems having no shared resource therebetween are executed concurrently.

* * * * *